United States Patent [19]

Lucier

[11] Patent Number: 5,265,334
[45] Date of Patent: Nov. 30, 1993

[54] DEVICE FOR MANUFACTURING A GROOVE BEARING, AND METHOD OF MANUFACTURING A GROOVE BEARING BY MEANS OF THE DEVICE

[75] Inventor: Pieter A. J. Lucier, Bilthoven, Netherlands

[73] Assignee: U.S. Philips Corporation, New York, N.Y.

[21] Appl. No.: 767,349

[22] Filed: Sep. 27, 1991

Related U.S. Application Data

[63] Continuation of Ser. No. 583,429, Sep. 17, 1990, abandoned.

[30] Foreign Application Priority Data

Sep. 21, 1989 [NL] Netherlands ............... 8902357

[51] Int. Cl.⁵ .............. F16C 33/00; B21D 53/00
[52] U.S. Cl. .............. 29/898.02; 29/898.13; 72/95; 72/100
[58] Field of Search ............ 29/724, 725, 898.02, 29/898.04, 898.044, 898.045, 898.048, 898.054, 898.066, 898.13; 72/75, 95, 100, 190, 216, 225; 384/625, 100, 99

[56] References Cited

U.S. PATENT DOCUMENTS 3,598,458 8/1971 Evans ...................... 384/625 X

FOREIGN PATENT DOCUMENTS 0002292  2/1981  European Pat. Off. .
0006426  1/1986  Japan .................. 29/898.02
0006427  1/1986  Japan .................. 29/898.02
1022391  3/1966  United Kingdom .
1163018  9/1969  United Kingdom .

OTHER PUBLICATIONS

"Design of Machine Elements", M. F. Spotts, 6th Ed., pp. 443–444, Prentice-Hall, 1985.

*Primary Examiner*—Mark Rosenbaum
*Assistant Examiner*—S. Thomas Hughes
*Attorney, Agent, or Firm*—Brian J. Wieghaus

[57] ABSTRACT

The invention relates to a device for manufacturing a hydrodynamic groove bearing formed with pumping grooves. The device comprises a hard pin around which, or a hard sleeve in which, a cage is arranged which has one or more annular patterns of holes which are concentric with the pin or sleeve and which are engaged by hard balls which project from both sides of the cage. The pin or sleeve and the cage can be translated and rotated relative to each other, the balls bearing against a bearing surface of the pin or sleeve. The bearing surface is constituted by a groove bottom of a continuous groove which is concentric with the pin or sleeve, the groove bottom extending in longitudinal sectional planes of the pin or sleeve as an arc of a circle whose radius is at least equal to the radius of the balls.

10 Claims, 1 Drawing Sheet

2

DEVICE FOR MANUFACTURING A GROOVE BEARING, AND METHOD OF MANUFACTURING A GROOVE BEARING BY MEANS OF THE DEVICE

This is a continuation of application Ser. No. 07/583,429, filed Sep. 17, 1990, now abandoned.

BACKGROUND OF THE INVENTION

The invention relates to a device for manufacturing a groove bearing having a bearing shaft and a bearing bush with cooperating bearing surfaces, of which at least one bearing surface is formed with at least one pattern of pumping grooves. The device comprises a bearing part and a cage which has one or more annular patterns of holes which are concentric with the pin or sleeve and which are engaged by hard balls which project from the cage and bear against a bearing surface of the bearing part. The bearing part and the cage are rotatable relative to each other. The bearing part may be a hard pin around which, or a hard pin in which, the cage is arranged.

The invention further relates to a method of manufacturing a groove bearing.

The device defined above and a method to be carried out by means of the device are known from EP-A 0,002,292, herewith incorporated by reference. The prior-art device is suitable for carrying out a method of manufacturing a hydrodynamic groove bearing comprising a bearing shaft and a bearing bush, which form cooperating surfaces, of which at least one surface is formed with at least one pattern of shallow lubricant pumping grooves. Such a hydrodynamic bearing is described in, for example, GB-A 1,022,391 and in GB-A 1,163,018, herewith incorporated by reference.

The prior-art device comprises a hard pin around which, or a hard sleeve in which, a cylindrical cage is arranged which has one or more annular patterns of holes which are arranged symmetrically about the central axis of the cage and which are engaged by hard balls having a diameter larger than the wall thickness of the cage. The cage and the pin or sleeve are each coupled to a drive arrangement capable of impressing a translation and a rotation upon the cage and the pin or sleeve. Thus, in carrying out the prior-art method the assembly comprising the pin or sleeve, the cage including the balls is translated and rotated relative to a bearing bush and a bearing shaft respectively, the balls bearing against the pin or the sleeve and being impressed into the softer material of the bearing bush and the bearing shaft respectively to form grooves therein.

It has been found that in carrying out the prior-art method the pin or the sleeve of the prior-art device is subjected to substantial wear as a result of large Hertzian stresses produced at the contact surfaces between the pin or sleeve and the balls. The wear manifests itself particularly as deformations of the pin or sleeve surfaces facing the cage, so that the contact surface of the pin or the sleeve becomes irregular, resulting in an inaccurate groove depth. In addition, this leads to a substantial wear of the balls.

SUMMARY OF THE INVENTION

It is an object of the invention to improve the device defined in the opening paragraph so as to minimize said wear.

To this end the device in accordance with the invention is characterized in that the bearing surface of the bearing part, which may be a pin or sleeve, is constituted by a groove bottom of a continuous groove which is concentric with the central axis of the pin or sleeve, the groove bottom extending in a longitudinal sectional plane of the pin or sleeve, which plane contains the central axis, as an arc of a circle whose radius is at least equal to the radius of the balls.

In the device in accordance with the invention the surface pressure at the contact surfaces of the pin or sleeve and the balls is kept within permissible limits, so that the device enables reproducible groove bearings with a high long-term accuracy to be manufactured. If required, the cage of the device may have several annular patterns of holes.

An embodiment of the device in accordance with the invention, in which the balls can sustain large forces for a long time, is characterized in that the balls have been compressed isostatically.

It is another object of the invention to provide a simple method which can be implemented by means of the device in accordance with the invention.

The method in accordance with the invention, which employs the device in accordance with the invention, which device comprises a hard pin around which, or a hard sleeve in which, a cage provided with hard balls is arranged, is characterized in that exclusively the cage or the pin or sleeve is driven to be translated or rotated. This means that if the cage is driven the pin or sleeve performs exclusively secondary movements derived from the cage movements, and if the pin or sleeve is driven the cage performs exclusively secondary movements derived from the movements of the pin or sleeve. This method simply ensures a favourable hobbing movement of the balls.

BRIEF DESCRIPTION OF THE DRAWINGS

The invention will now be described in more detail, by way of example, with reference to the drawing in which.

DESCRIPTION OF THE PREFERRED EMBODIMENTS

Figure 1:
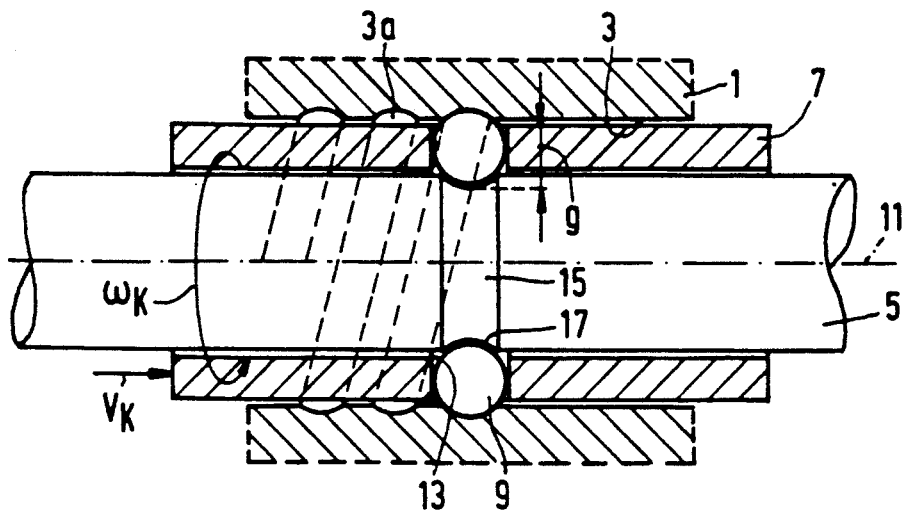
FIG. 1 shows diagramatically and not to scale a first embodiment of the device in accordance with the invention for forming a groove pattern in a bearing bush.

In FIG. 1 the reference numeral 1 denotes a bearing bush of a hydrodynamic bearing, whose inner surface 3 should be formed with a groove pattern 3a. The bearing bush 1 is immobilized by means, not shown. An assembly comprising a bearing part (hard pin 5), a cylindrical cage 7 and hardened isostatically compressed metal balls is arranged in the bearing bush. The balls 9 engage in holes 13 formed in the cage 7 in an annular pattern which is symmetrical about the central axis 11. The pin 5 has a concentric groove 15 whose groove bottom 17 serves as a bearing surface for the balls 9 and has the shape of an arc of circle viewed in the sectional planes of the pin 5 which contain the central axis 11, the plane of the drawing being one of these planes. The radius of the circle comprising said arc of circle is equal to the radius of the spherical balls 9. The balls 9 have a diameter which is so much larger than the maximum clearance g between the bearing bush 1 and the bottom 17 of the groove in the pin 5 that the desired groove depth in the bearing bush 1 can be obtained. The cage 7 is coupled to a drive arrangement, not shown, which is known per se and which is capable of impressing a translational movement $v_k$ and a rotational movement $w_k$ on the cage 7. Since the balls 9 partly engage in the groove 15 axially couple the cage to the pin and movements of the cage 7 also cause the pin 5 to be moved. Thus, the assembly comprising the pin, the cage and the balls is translated and rotated through the bearing bush 1, the balls rolling along the bottom 17 of the groove in the pin 5 and along the inner surface 3 of the bearing bush 1, thereby causing bearing grooves to be formed in the softer material of the bearing bush 1. The number of helical bearing grooves thus formed corresponds to the number of balls used. The pitch of these grooves depends on the ratio between the translational velocity $v_k$ and the rotational velocity $w_k$ of the cage 7. Thus, by varying this ratio grooves of varying pitch can be obtained. In order to form a herringbone pattern the direction of rotation should be reversed upon completion of a specific travel.

In the situation illustrated in FIG. 1 the cage 7 is driven but it is also possible to drive the pin 7, the secondary movements being performed by the cage 7.

Figure 2:
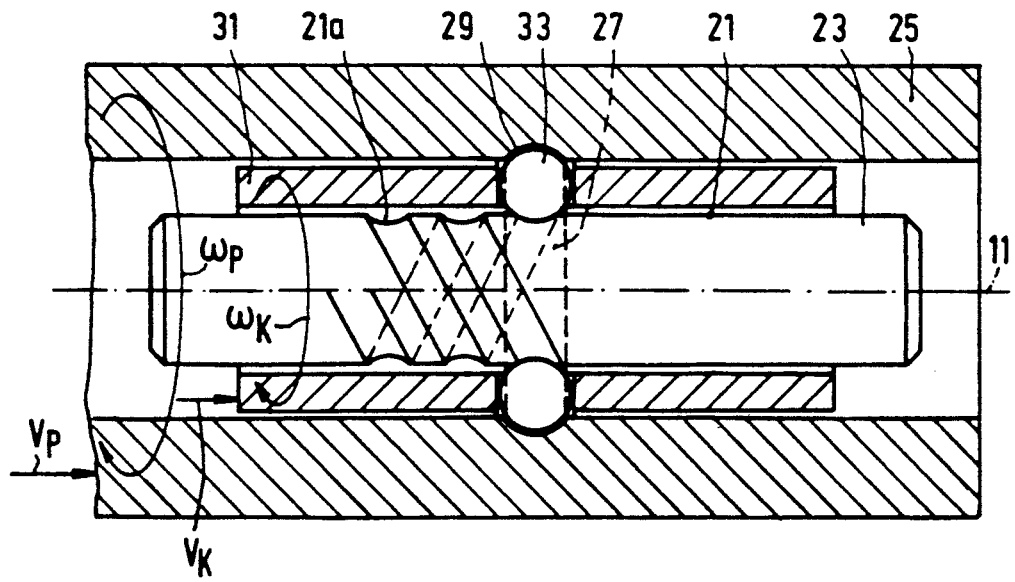
FIG. 2 shows diagramatically and not to scale a second embodiment for forming a groove pattern in a bearing shaft.

FIG. 2 shows how bearing grooves 21a can be formed in an outer surface 21 of a bearing shaft 23. The bearing part of the device is comprised of a hardened cylindrical sleeve 25 with a continuous groove 27 whose groove bottom serves as a bearing surface for a plurality of balls 33 arranged in a cage 31. Similarly to the cage 7 in the above example the cage 31 is coupled to a drive arrangement, the secondary movements $v_p$ and $w_p$ being performed by the sleeve 25.

For completeness' sake it is to be noted that the invention is not limited to the embodiments disclosed herein. For example, the cage may have several annular patterns of holes and the pin or sleeve may have a corresponding number of grooves.

I claim:

1. A method of manufacturing a groove in a surface of an article, said method comprising the steps of:
   a) providing a cage having a circular cage wall with an annular pattern of holes and a plurality of balls each disposed in a respective said hole;
   b) providing a bearing part defining a longitudinal axis, said bearing part having a continuous bearing groove concentric with said longitudinal axis;
   c) arranging said cage and said balls to be rotatable with respect to said bearing part and such that said balls project from said cage into said bearing groove and rotatably bear against the surface of said groove, said bearing groove having a cross-sectional shape, in a longitudinal sectional plane of said bearing part which contains said longitudinal axis, selected such that said balls smoothly roll in said bearing groove and axially couple said bearing part to said cage;
   d) arranging said article such that said balls engage the article surface into which said grooves are to be formed; and
   e) translating and rotating exclusively one of said bearing part and said cage along and about said longitudinal axis, whereby a secondary rotation and translation of said other one of said cage and bearing part is affected.

2. A method according to claim 1, wherein said bearing part provided is a cylindrical pin around which said cage is rotatably disposed.

3. A method according to claim 2, wherein said cross-sectional shape of said bearing groove is defined by an arc of circle having a radius equal to or larger than said balls.

4. A method according to claim 1, wherein said bearing part provided is a cylindrical sleeve in which said cage is rotatably disposed.

5. A method according to claim 4, wherein the cross-sectional shape of said bearing groove is defined by an arc of circle having a radius equal to or larger than said balls.

6. An apparatus for manufacturing grooves in a surface of an article, said apparatus comprising:
   a) a cage having a circular cage wall with a predetermined wall thickness and an annular pattern of holes in said wall;
   b) a plurality of spherical balls each rotatably disposed in a respective said hole of said cage wall and having a diameter greater than said wall thickness; and
   c) a bearing part defining a longitudinal axis, said bearing part having a continuous bearing groove concentric with said longitudinal axis for receiving said balls,
   said cage being rotatable relative to said bearing part and said balls projecting from said cage into said bearing groove and bearing against said bearing groove surface, said balls protruding through said cage wall on its side remote from said bearing groove for engagement with the surface of an article, and
   said bearing groove having a cross-sectional shape, in a longitudinal sectional plane which contains said longitudinal axis, selected such that said balls smoothly roll in said bearing groove and axially couple said bearing part to said cage for imparting a secondary rotation and translation to one of said bearing part and said cage along and about said longitudinal axis upon a rotation and translation exclusively of said other one of said bearing part and said cage when said balls are engaged with the surface of an article.

7. An apparatus according to claim 6, wherein said bearing part is a cylindrical pin around which said cage is rotatably disposed.

8. An apparatus according to claim 7, wherein said cross-sectional shape of said bearing groove is defined by an arc of circle having a radius equal to or larger than said balls.

9. An apparatus according to claim 6, wherein said bearing part is a cylindrical sleeve in which said cage is rotatably disposed.

10. An apparatus according to claim 9, wherein said cross-sectional shape of said bearing groove is defined by an arc of circle having a radius equal to or larger than said balls.

* * * * *